Aug. 22, 1967 Y. M. C. R. HARRAND 3,337,853

INTERMEDIATE STORAGE DEVICE

Filed June 29, 1964 3 Sheets-Sheet 1

United States Patent Office 3,337,853
Patented Aug. 22, 1967

3,337,853
INTERMEDIATE STORAGE DEVICE

Yves Marie Charles René Harrand, Cachan, France, assignor to Societe Europeenne pour le Traitement de l'Information, Montrouge, France, a company of France Filed June 29, 1964, Ser. No. 378,742
Claims priority, application France, July 3, 1963, 940,226, Patent 1,369,507
7 Claims. (Cl. 340—172.5)

ABSTRACT OF THE DISCLOSURE

Intermediate storage device comprising a plurality of transmission means connected by a matrix selection type connection center with a central unit of a computer on one side and an external device or another computer on the other side. The transmission means has a number of storage units each for storing one bit of information, and the same number of control flip-flops with two stable states, each flip-flop being associated with a storage unit and storing a pilot bit of information associated with that in the flip-flop. The flip-flops are respectively connected so that the information in one storage unit and its associated flip-flop may be exchanged with the information of an adjacent storage unit and its associated flip-flop.

The present invention relates to intermediate storage devices which allow for the adaptation of bits of information entering and leaving a digital computer.

It is well known that external elements, of various kinds may be connected to a digital computer, such as magnetic recording devices, punch card recording devices, printing devices, etc. and that in general they exchange with the central computing unit, bits of information known as "characters," that is, numbers, letters or symbols. However, the frequency or speed at which these characters are stored or read by such external devices varies considerably from one device to the other, so that it is neither possible nor advantageous to adapt the actual rhythm of the computing unit to the writing or reading rate of each of the external devices.

It has thus been proposed to interpolate between the central unit and the external devices, intermediate storage devices for temporarily storing a certain number of characters during their transfer so as to absorb the variations in delivery of the information after it has left one element but before it enters the other element. For example, in prior proposals, the reading element of a magnetic tape advancing device feeds N characters to an intermediate storage device which is then read at a considerably greater speed by the central computing unit during the interval of time separating one group of N charatcers on the tape from the next. In other proposals the intermediate storage device has a capacity of only one character, which means that the computer must release one cycle of the central storage device at each demand for transfer.

These prior arrangements have the disadvantage of either imposing a subdivision of the information into blocks of fixed or restricted length or of providing the possibility to interrupt an instruction of the computer during its execution, if it should last longer than the mean period of transfer of the characters. Another drawback of the prior arrangements is that it is necessary to provide different transmission means at one and the same time for each direction of transfer of the bits of information and for each category of device, according to whether it has a small, medium or large output.

It is an object of the invention to overcome the above-mentioned disadvantages by means of an intermediate storage device comprising transmission means which can be connected to the central unit of a computer on one side and to any one of the external devices or to another computer on the other side, said transmission means being equally capable of causing the transfer of information in one or the other direction, or even in both directions at once, irrespective of the actual output of the external device, within certain predetermined, but optionally adjustable limits.

The intermediate storage device of the invention, includes one or more transmission means which may be connected, by a connecting center of a matrix selection type, to a central computing unit on one side and, on the other side, to an external device or to another computing unit, which storage device is characterized in that each transmission device is composed of a certain number of storing units capable of storing one bit of information or character; there being associated with each character a binary pilot bit of information which is stored in a control flip-flop having two stable states and associated with the storage unit containing said charatcer, the unit and their flip-flop being respectively connected in cascade so that the contents of one unit and of its flip-flop may be exchanged with the contents of an adjacent unit and of its flip-flop according to synchronous single-phase logic circuits, a transfer control pulse for triggering the exchange of information being produced when the flip-flops of two adjacent storage units are in relative states of predetermined configuration.

According to one aspect of the invention, the binary pilot information associated by agreement with each character indicates the direction in which the character should be transferred in the transmission means, from the central unit to the peripheral external device or vice versa, one of these binary bits of information accompanying the characters derived from one of these elements, whilst the other binary bit of information accompanies the vacant characters corresponding to unoccupied storage units.

Compared with known devices the intermediate storage device of the invention has the following main advantages.

(a) Very great flexibility of use, made possible because each means of connection is universal, that is, is capable of providing any output in any direction.

(b) Economy, by reason of the possibility that each connecting means is adapted by the progressive adjunction or suppression of standard storage units according to the speed of the external element to be connected and to the degree of simultaneity desired.

(c) Cheapness, since only one device or means is necessary to provide bi-directional connection with the external devices calling for two directions of transfer. Such bi-directional connection not only relates to equipment such as magnetic tape recorders but also to all those output devices which may have to transmit records of execution to the central unit.

The invention will be better understood with reference to the following description and the accompanying drawings, provided by way of example only, in which.

Figures 1, 2:
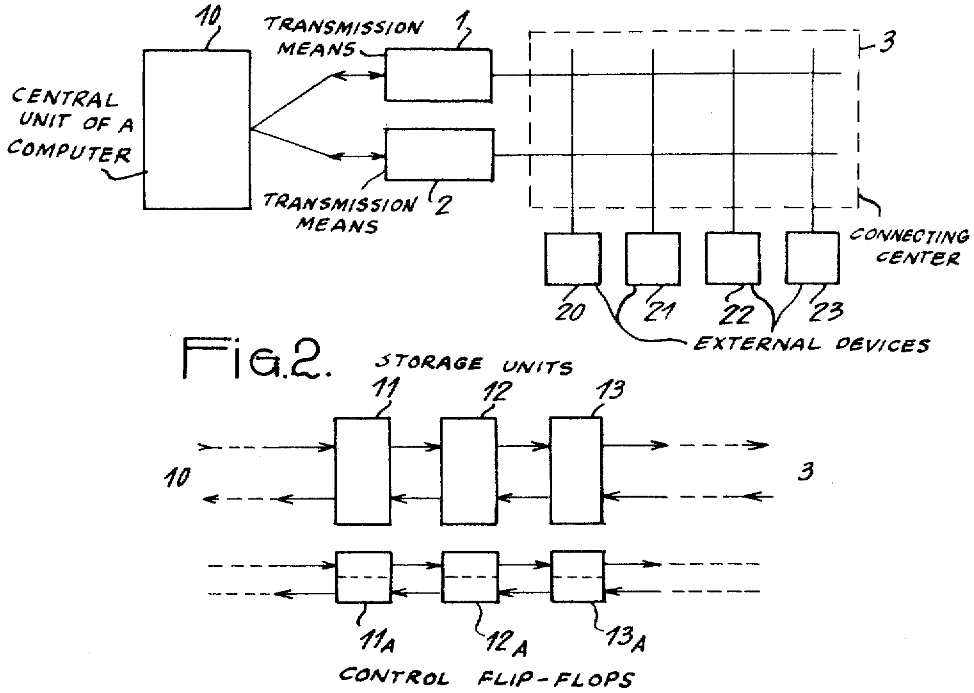
FIG. 1 is a block diagram of the general arrangement of an intermediate storage device of the invention.
FIG. 2 is a block diagram of the arrangement of a connecting means of the invention.

In FIG. 1 the central unit 10 of a digital computer is connected to external devices 20, 21, 22, 23 by an intermediate storage device comprising transmission means, for example two in number, represented by 1, 2. Each of these means can temporarily establish connection between the central unit 10 and any one of the external devices 20 to 23, the connection then being changed to another device by means of a connecting centre 3, for example of a matrix selection type.

Each transmission means can provide the transfer of information in both directions and substantially comprises a certain number of units, such as parallel registers for example. This number is chosen according to the maximum output which the transmission means must convey, that is, according to the nature of the external devices to which it is to be connected, and may thus be varied.

FIG. 2 shows a block diagram of such a transmission means. The members 11, 12, 13 . . . represent the units provided for storing one character of information each. Contained in each unit, irrespective of whether it is effective or vacant, there is an associated pilot binary piece of information which is stored in an associated control storage device 11A, 12A, 13A . . . such as a flip-flop having two stable states for example. According to an agreement, which will be described below, this pilot binary information attached to a character indicates the direction in which the character must be transferred.

The principle on which the invention is based consists in the exchange of the contents of two adjacent units in accordance with a synchronous single-phase logic circuit, the operation of which will now be described with reference to a storage circuit to which this type of logic circuit is applied.

Figure 3:
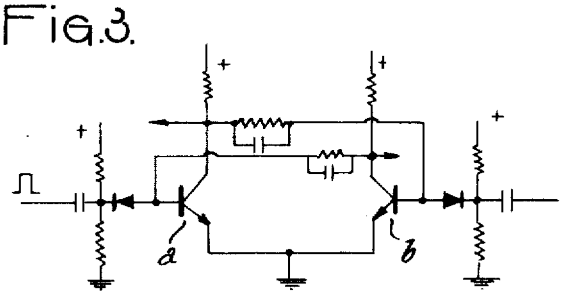
FIG. 3 is a circuit diagram of a flip-flop operating in accordance with a synchronous single-phase logic circuit.
Figure 4:
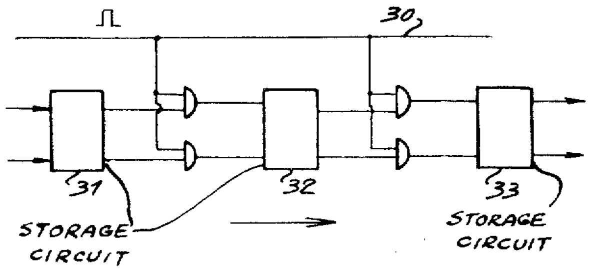
FIG. 4 is a diagram showing the application of this logic circuit to a displacement register.

FIG. 3 shows the known circuit diagram of a bistable circuit having transistors *a*, *b* which can only change their state under the influence of a steep front pulse applied from the appropriate side to the base of the corresponding transistor. It is a well-known property of this kind of flip-flop that it is possible to simultaneously transfer by means of a single pulse a binary bit of information occurring at the input of the circuit in the flip-flop and the binary bit of information previously stored in another flip-flop. A known circuit of a displacement register which can utilize this property is diagrammatically shown in FIG. 4, in which a single pulse applied to the conductor 30 causes the displacement to the right of the binary information contained in the storage circuits 31, 32 and 33, etc. such that the contents of 31 are transferred to 32, whilst the previous contents of 32 are transferred to 33, and so on.

By extension it is possible to effect the "exchange" of parallel registers by displacement according to the same principle. When, in such a displacement circuit comprising a cascade of flip-flop or registers, a full element is between two elements having identical contents, a general displacement in one direction or the other takes place by the exchange of the contents of two elements, that is, as if the contents of the full element have been replaced by those of the element whose place it takes.

By applying this principle to registers constituting the units 11, 12, 13 of FIG. 2 and to their control flip-flops 11A, 12A, 13A, it is possible to achieve the transfer of the character contained in the unit 11 to the unit 12, for example, in parallel with the transfer of the character contained in the unit 12 to the unit 11 and to simultaneously achieve the exchange of the contents of their associated flip-flops 11A and 12A.

According to the agreement adopted, the pilot binary information associated with each character indicates the direction in which the character must be transferred. For example, the characters coming from the central unit or those which must be transferred, to an external device will be associated with the number "0," whilst the characters coming from the external device or those which must be transferred to the central unit will be associated with the number "1." Converse agreement is clearly also possible.

Initially, one instruction from the computer has the effect of causing all of the control flip-flops 11A, 12A, 13A, etc. to assume the same state, the binary information corresponding to this state being a "1" when the transfer of characters occurs from the external device to the central unit, and "0" when the transfer occurs in the other direction.

Based on the agreement adopted above, the logical organization of the connecting circuits is such that one control pulse to trigger the exchange of information between two adjacent units is only produced if the configuration of the states of their flip-flops is "0–1." In the case the three other possible configurations "0–0," "1–0" and "1–1" no exchange can take place. It is, in fact, easy to verify that the configuration "0–1" is the only one with which a transfer in the desired direction is possible with this agreement.

Figure 5:
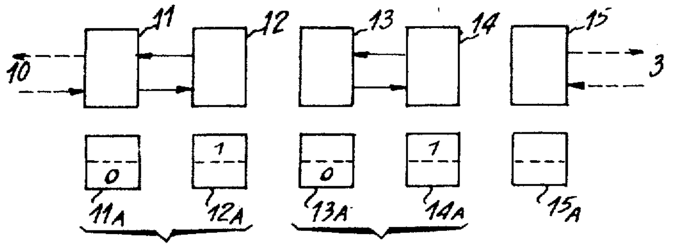
FIGS. 5 to 7 show the operation of exchange of information between different units of the invention and different stages in a transfer of characters.

FIG. 5 illustrates how each pilot bit of information accompanying the contents of a module is distributed, with this mode of operation, in the associated flip-flops. According to the above rule, there will be an exchange between the contents of the units 11 and 12, as their flip-flops 11A and 12A exhibit the configuration "0–1." Similarly, there will be an exchange between the contents of the units 13 and 14, as their flip-flops 13A and 14A have the same configuration.

Figure 6:
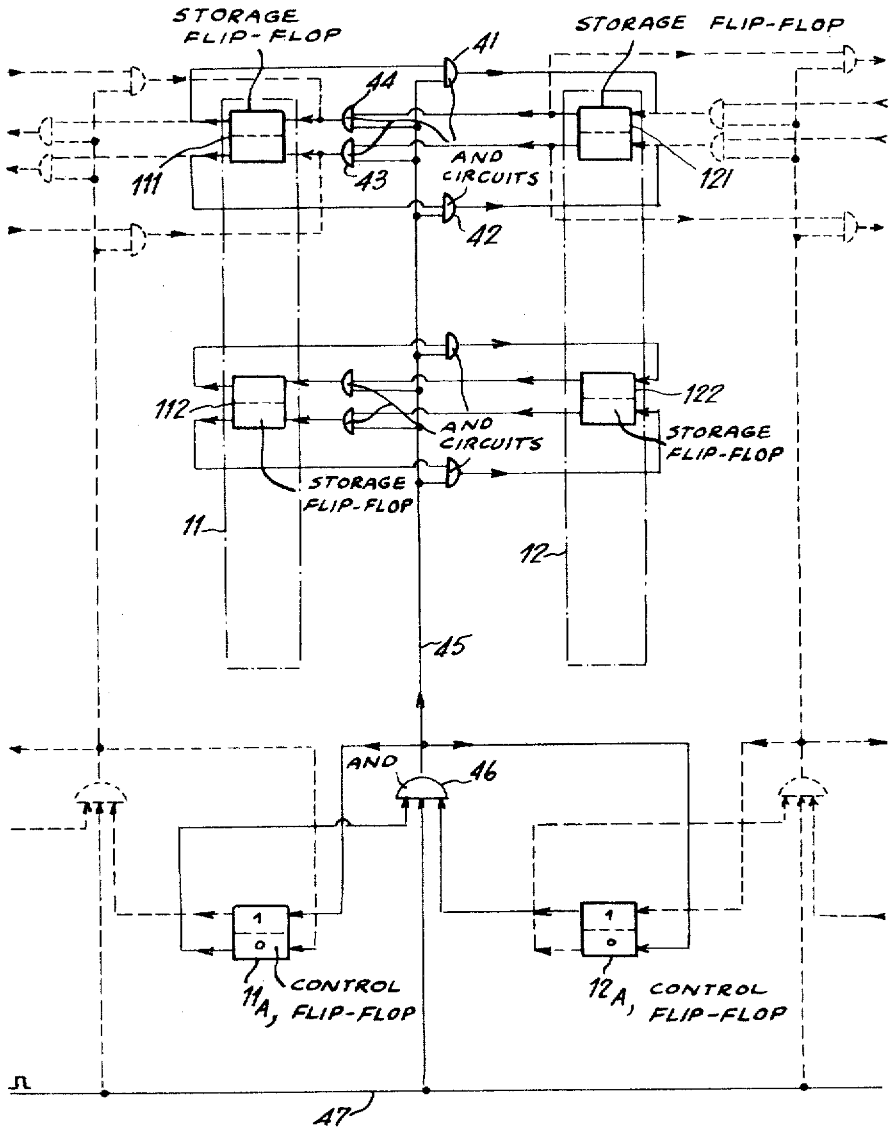

By way of example only, FIG. 6 shows in more detail a suitable circuit by means of which a transfer of information between two adjacent units may be obtained. The two units 11 and 12 are composed of a plurality of bascules, the number of which depends on the number of bits of the information to be transmitted, only two flip-flops 111, 112 and 121, 122 being shown in each case, since it is clear how a larger number of flip-flops can be incorporated. It will thus suffice to describe the connections between two flip-flops of the same order, for example 111 and 121, and the associated control flip-flops 11A and 12A.

The two outputs of the flip-flops 111 are connected to the two inputs of the flip-flop 121 by one of the inputs of two AND circuits 41, 42. Similarly the outputs of the flip-flop 121 are connected to the inputs of the flip-flop 111 by one of the inputs of two other AND 43, 44. The flip-flops 111 and 121 are also each connected in a similar manner to homologous flip-flops of adjacent storage units upstream or downstream, as shown with broken lines.

The other input of each of the AND circuits 41 to 44 is connected to a conductor 45 which is connected by a three-input AND circuit 46 to the circuit of the control flip-flop 11A, 12A. The output "0" of the flip-flop 11A is connected to one of the inputs of the circuit 46, whilst the output "1" of the flip-flop 12A is connected to another input of this circuit. The inputs "1" and "0" of flip-flops 11A and 12A respectively are connected to the input of the circuit 46. The output "1" and the input "0" of the flip-flop 11A, and the input "1" and the output "0" of the flip-flop 12A are connected to AND circuits, homologous to circuit 46, upstream and downstream respectively, as indicated by the analogous connections shown in broken lines. The third input of the circuit 46 is connected to a common conductor 47 to which are applied the rhythmic pulses derived from the computer and designed to trigger the transfers between units.

Assuming that the outputs "0" and "1" of the flip-flops 11A and 12A respectively are connected to the inputs of the circuit 46, a transfer control pulse applied to the conductor 47 can only be transmitted to the conductor 45 if the states of these flip-flops show the configuration "0–1", as predetermined by the agreement. In all other cases the circuit 46 cannot produce a pulse at its output to the conductor 45.

When this preferential configuration "0–1" exists on the flip-flops 11A, 12A, the output pulse of the circuit 46 then causes the two flip-flops to change their states and also causes the flip-flops 111 and 121, 112 and 122 etc. to change their states, in other words, causes an exchange of contents between the storage unit which is full and that which is empty, according to the process described above.

Figure 7:
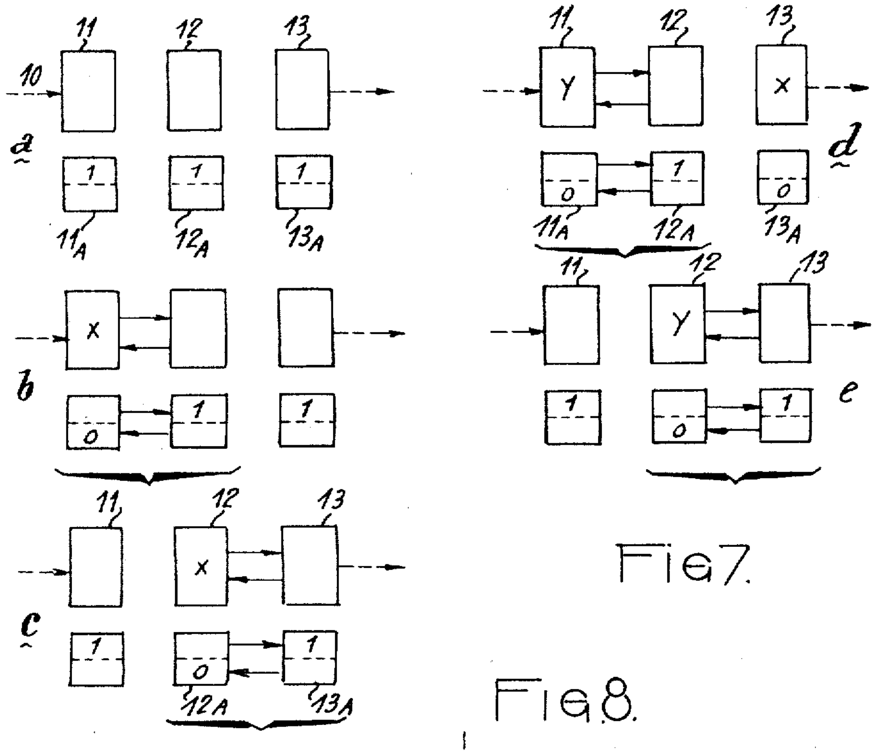

The transfer of information to the intermediate storage device of the invention will first of all be explained in a general manner in the simple case where the information must flow in a single direction only, either from the central unit towards an external element (output), or in the reverse direction (input). Under these conditions, the storage units are all empty at the beginning and exchange occurs between a meaningful character and an "empty" character, that is, there is effective transfer of a bit of information in one direction and liberation of a unit in the other. The case will now be considered of the output of information transferred from the central unit to an external element, by way of example, with reference to FIG. 7, which shows different stages of this transfer.

As has already been stated, the flip-flops 11A, 12A, 13A, etc. associated with the different units 11, 12, 13, etc. are initially empty and they are placed in the state "1" by an instruction from the computer, as shown in FIG. 7*a*.

The character X derived from the storage device of the computer 10 is then transferred to the unit 11, accompanied by its pilot bit of information "0", which arrives in the associated flip-flop 11A. The character must then progress towards the external element (FIG. 7*b*). There then follows an exchange between the contents of the units 11 and 12, the first being full and the second empty and the configuration of the states of their associated flip-flops 11A and 12A being favorable, i.e. "0–1".

FIG. 7*c* shows the character X transferred to the unit 12, accompanied by its binary pilot bit of information "0", which has arrived in 12A, after there has been an exchange of the contents of 11 and 12, and of 11A and 12A. The flip-flops 12A and 13A now show the configuration "0–1" and the transfer of the character X continues (FIG. 7*d*), whilst a second character Y may or may not be withdrawn from the storage device of the central unit 10 at the same time. The character Y would then be transferred as the units are made available by the progression of the character X (FIG. 7*e*).

In the case of transfer in the reverse direction, that is, when information is to travel from the external element to the central unit, the operation is the same, except that the initial state of all of the flip-flops is this time "0" and not "1". The characters provided by the external device are then accompanied by a pilot bit of information "1", whilst the central unit places a pilot bit of information "0" into a flip-flop each time the associated unit is liberated.

The invention is not confined to the case of the transfer of information either in one direction or the other, but it can also be utilized for the simultaneous transfer of two bits of information, one in each direction, on condition that the external device and the central unit produce characters exactly in time. One example of the realization of this condition is provided when two identical or different computers are inter-connected by an intermediate storage device of the invention and synchronized.

Figure 8:
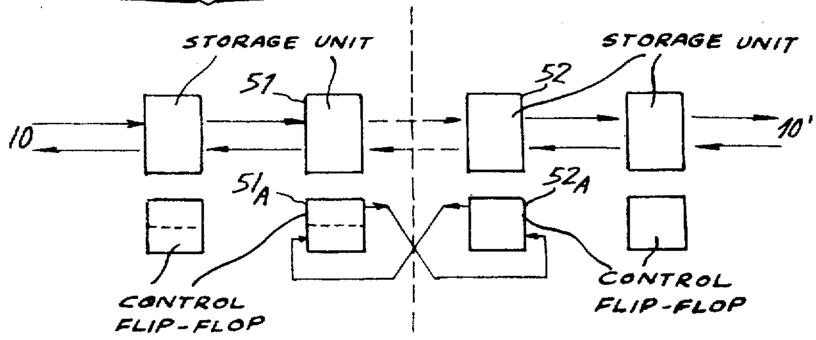
FIG. 8 shows the connection of two central computing units connected by an intermediate storage device of the invention.

This connection between two computers may be used alternately in one direction and in the other. FIG. 8 shows how the central units 10 and 10' of two computers may be interconnected in this manner. Numbers 51 and 52 designate the end units of two intermediate storage devices and their associated control flip-flops 51A, 52A are connected (across a connecting or directing center) in such a manner that their inputs and outputs are crossed: the input "1" of the flip-flop 51A is connected to the output "0" of the flip-flop 52A, and the input "1" of the flip-flop 52A to the output "0" of 51A. This arrangement thus ensures that each character which leaves the central unit 10 of the computer becomes a character demanding entry into the central unit 10', and vice versa.

I claim:

1. Intermediate storage device comprising a plurality of transmission means which can be connected, by a connecting center of matrix selection type, to a central unit of a computer on one side and to an external device or another computer on the other side, each transmission means including a certain number of units capable of storing one bit of information each, there being associated with each bit of information by agreement a binary pilot bit of information, control flip-flops having two stable states and associated with respective units containing said information, said control flip-flops storing the pilot bits of information associated with the information in the respective units, the units and their flip-flops being respectively connected in cascade so that the contents of one unit and of its flip-flop may be exchanged with the contents of an adjacent unit and of its flip-flop respectively according to a synchronous single-phase logic system, a transfer control pulse for triggering the exchange of information being produced when the flip-flops of two adjacent units are in relative states of predetermined configuration.

2. Intermediate storage device according to claim 1, wherein the binary pilot information indicates the direction in which the stored information is to be transferred in the transmission means, from the central unit towards the external device or vice versa, one of these pilot bits of information accompanying the information derived from one of these elements, whilst the other pilot bit of information accompanies the vacant information corresponding to unoccupied modules.

3. Intermediate storage device according to claim 1, wherein initially, all of the control flip-flops are caused by an instruction to assume the same state, the pilot information corresponding to this state depending on the desired direction of transfer—from the central unit towards the external device or vice versa.

4. Intermediate storage device according to claim 1, wherein the logical arrangement is such that the exchange of bits of information between two adjacent units is only effected in the case of said predetermined configuration of the states of the flip-flops, all other configurations being unable to produce a transfer control pulse.

5. Intermediate storage device according to claim 1, wherein the transfer control pulse triggering the exchange of information between two adjacent units is transmitted by a three-input AND circuit, one input of which is connected to a conductor to which there is applied a rhythmic pulse by the computer, whilst the other two inputs are connected to each of the outputs of the control flip-flops which correspond to the said predetermined configuration.

6. Intermediate storage device according to claim 1, wherein the intermediate storage device is connected between two computing units which provide information synchronously, the transfer of information leaving said units being effected simultaneously in both directions, the inputs and outputs of the control flip-flops associated with the end units of the transmission means being cross-connected.

7. Intermediate storage device according to claim 1, wherein the capacity of a transmission device varies with the number of units it contains and is adjustable by addition or removal of units according to the speed of the external device connected to the transmission device.

No references cited.

ROBERT C. BAILEY, *Primary Examiner.*

R. ZACHE, *Assistant Examiner.*